United States Patent [19]

Schaarschmidt

[11] Patent Number: 5,490,812
[45] Date of Patent: Feb. 13, 1996

[54] BONING DEVICE AND METHOD

[75] Inventor: Martin Schaarschmidt, Warendorf, Germany

[73] Assignee: Schaartec GmbH & Co. KG, Warendorf, Germany

[21] Appl. No.: 256,300

[22] PCT Filed: Oct. 10, 1993

[86] PCT No.: PCT/EP93/02922

§ 371 Date: Oct. 3, 1994

§ 102(e) Date: Oct. 3, 1994

[87] PCT Pub. No.: WO94/09634

PCT Pub. Date: May 11, 1994

Related U.S. Application Data

[63] Continuation-in-part of Ser. No. 4,977, Jan. 15, 1993.

[30] Foreign Application Priority Data

Oct. 23, 1992 [EP] European Pat. Off. ............. 92118133

[51] Int. Cl.⁶ .................................................. A22C 17/04
[52] U.S. Cl. .......................................... 452/138; 452/170
[58] Field of Search .................................. 452/138, 135, 452/166, 170

[56] References Cited

U.S. PATENT DOCUMENTS

| | | |
|---|---|---|
| 2,893,051 | 7/1959 | Massengill . |
| 3,296,654 | 1/1967 | Segur . |
| 3,412,425 | 10/1968 | Sturm . |
| 3,470,581 | 10/1969 | Hopkins . |
| 3,510,908 | 5/1970 | Segur et al. . |
| 4,207,653 | 6/1980 | Gasbarro . |
| 4,377,884 | 3/1983 | Viscolosi . |
| 4,811,457 | 3/1989 | Lindert . |
| 4,993,113 | 2/1991 | Hazenbroek . |
| 5,071,388 | 12/1991 | Lindert et al. . |
| 5,090,940 | 2/1992 | Adkison .................. 452/138 |
| 5,232,397 | 8/1993 | Gagliardi, Jr. 452 ............ 452/135 |
| 5,267,891 | 12/1993 | Cresson et al. ............. 452/138 |
| 5,277,649 | 1/1994 | Adkinson .................. 452/138 |
| 5,368,519 | 11/1994 | Curtis et al. ............... 452/135 |

FOREIGN PATENT DOCUMENTS

| | | |
|---|---|---|
| 0439780A | 8/1991 | European Pat. Off. . |
| 2227827 | 5/1973 | France . |
| 2566629 | 1/1986 | France . |
| 2047772 | 3/1972 | Germany . |
| 9214207 | 8/1993 | Germany . |
| 8302495 | 7/1983 | Netherlands . |
| 2124883 | 2/1984 | United Kingdom . |

OTHER PUBLICATIONS

Abstract 8302495.
Abstract 2227827.

*Primary Examiner*—Willis Little
*Attorney, Agent, or Firm*—Knobbe, Martens Olson & Bear

[57] ABSTRACT

The present invention relates to a device and a method with the following working steps:

holding the limb (1) to be boned;

severing the center joint (3), including the tendons adhering thereto;

severing the end joint portion (5) and/or the end portion (6), including the tendons adhering thereto;

clamping the limb (1) between a first pressure plate (10) and a second pressure plate (11), pressing the meat of the limb (1) between the pressure plates (10, 11) and partly pushing out the at least one bone (7, 8, 9) through the pressure plate; and ejecting the at least one bone (7, 8, 9) with the aid of a pushing means (12, 13, 14).

20 Claims, 9 Drawing Sheets

BONING DEVICE AND METHOD

This application is a continuation-in-part of application Ser. No. 08/004,977 filed Jan. 15, 1993, by the same inventor.

DESCRIPTION

The present invention relates to a device and a method for boning limbs of poultry or of animals of similar build, in particular, for boning wings and legs.

The prior art reveals the most different devices and methods for automating a boning process. Manual boning, i.e., manual removal of meat is relatively labor-intensive. Furthermore, a complete boning process is most of the time not possible, so that a relatively high percentage of usable mass of meat will remain on the bone. As a consequence, efficiency is very low. With automatically operating methods and devices, one must adopt such a procedure that rapid, reliable and thorough boning is possible with the manual efforts being as small as possible. Especially with small limbs, such as poultry legs or poultry wings, this requires great efforts.

The devices which are known from the prior art and designed for such uses are most of the time based on a fundamental technical principle in which the bone is removed from the meat during the boning operation. EP-A1-439 790, for instance, describes a device in which the limb is held at one end while the meat adhering to the other terminal bone is stripped off. Such a procedure is likely to fail because the whole stripping force has to be intercepted by the center joint. When the center joint has been damaged or when one of the two other bones has been broken, it is not possible to perform the boning operation. A similar removal is already known from FR-A2-566 629 where only a partial boning operation is, however, performed because the projecting bone is to serve holding purposes during consumption.

It is known from EP-A1-402 647 that, as far as poultry or the like is concerned, the center joint is punched out in the stretched state of the extremity and the bones are laterally removed. The problem arises here also that in case of a broken bone a complete removal is not guaranteed, so that additional checks are required. Furthermore, the bones are gripped on the outer joint balls, so that tendon parts or parts of the muscular tissue can also be removed due to the stripping and removing operations.

Apart from the functional reliability of the method, it is important with such boning processes that only a very small period of time is needed for the boning operation. It is only in this way that the devices can be used in an economic way.

Another problem arises with respect to the stability of the skeleton of the limbs to be boned. Especially with fattened poultry, the bones have no adequate strength. As a consequence, procedures are ruled out that are known from boning operations for other animals, such as pigs or cattle. It is, for instance, not possible to separate the bones in the longitudinal direction to perform the boning process.

It is the object of the present invention to provide a method and a device which, being of simple configuration and simple reliable applicability, permit a reliable boning of limbs. The inventive device and the inventive method are to be usable with both wings or legs of poultry and with comparable limbs of similar animals, such as rabbits, sheep, etc.

As for the apparatus, this object is attained according to the invention through a device having the following features:

a holding device for clamping the limbs;

a first cutting means for severing a center joint of the limb;

a second cutting means for severing end joints and/or end portions of the limb; and an ejector device for ejecting the bones.

The device of the invention is characterized by a number of considerable advantages. The principle underlying the invention is that the bones are pressed out from the meat of the limbs. Since bones have a very great compressive strength, adequate forces can be applied to push the bones out of the meat. Furthermore, no problems arise with partly broken or damaged bones because even a bone which has been broken into two parts can be pushed out in a reliable manner. Possibly existing splinters of bones are also removed through the existing channel. Since both the center joint and the end joints and/or end portions of the limbs are removed with the aid of the device of the invention prior to ejection, there just remains a substantially straight piece of bone which can be removed without any problems. The respective tendons are removed in a reliable manner due to the separation of the joints and/or end portions. This is also of great advantage because operative trouble or breakdown need not be feared, and no additional meat is removed together with the bones during the boning operation.

Another advantage of the solution of the invention is that especially the radius of a wing, for instance, of a chicken can be removed in a reliable manner. Especially with these tiny needle-like bones, the use of a reliably operating device and a corresponding method is of importance.

Furthermore, it is of special advantage that the invention can be used without any modifications for right and left limbs, i.e., right or left wings or legs, etc. Constructional or procedural changes are not necessary. This leads to a very considerable advantage in comparison with the prior art because the devices of the prior art must always be built for right or for left limbs.

In an especially advantageous development of the invention, the holding device comprises a stripping die means for pressing the center joint therethrough and for stripping off the meat and/or associated skin in the area of the center joint. Especially with chicken wings, the center joint (knee joint) is covered by a relatively thick meat and/or skin layer. Efficiency can considerably be increased by stripping off this meat and/or skin layer because said meat continues to stick to the limb upon subsequent cutting off or separating of the center joint.

To be able to work the limbs integrally in one operation, it may be of very great advantage when the holding device is designed such that the bones are clamped substantially in parallel. This means that for instance a wing or a chicken leg is bent with respect to the knee or elbow joint accordingly so as to be able to align the bones in parallel with one another. This alignment of the bones makes it possible to perform a complete boning process within a few operations. As an alternative, the upper wing and the lower wing could however be boned in separate operations as residual parts after the center joint has been severed.

The joints or joint balls are preferably separated with the aid of a saw.

In an advantageous development of the invention the ejector device comprises a first pressure plate and a second pressure plate according to the invention. These can be moved relative to one another with interposition of the meat of the limb. The meat is thereby pressed and compressed, so that it has increased strength on the one hand and the bones within the meat are already somewhat pressed out on the other hand. This will facilitate the subsequently following entire ejection of the bones. The first pressure plate is provided with recesses for pushing the bones therethrough. These recesses may have the shape of cylindrical holes, but it is also possible to facilitate the threading of the bones by designing the recesses in the shape of funnels.

The second pressure plate is provided with ejector means, preferably in the form of pushing means. These are guided in recesses of said second pressure plate and designed such that they are substantially associated with the position of the bones to be ejected.

In an alternative development of the invention, at least one of the pressure plates is formed as clamping tongs, the latter being also provided with recesses for gripping around the bones. As a consequence, the limb can selectively be fixed and aligned in an even more precise manner at the beginning of the processing operation. The following steps are taken in the method of the invention:

holding the limb to be boned;

severing the center joint portion, including the tendons adhering thereto;

severing the end joint portion and/or the end portion, including the tendons adhering thereto;

clamping the limb between a first pressure plate and a second pressure plate, pressing the meat of the limbs between the pressure plates and partly pushing out the at least one bone through the pressure plate;

ejecting the at least one bone with the aid of a pushing means.

Hence, the method of the invention is characterized in that the individual steps can be carried out fully automatically. Any manual reworking is not required. Furthermore, a high degree of operational reliability is ensured. While it is possible to bone two chicken legs or chicken wings per minute by hand, the method of the invention permits an increase to about 40 pieces per minute. In addition, the meat yield is increased by 2% or more.

The device can be cleaned and serviced in a very easy manner due to the simple design of the device of the invention and the method of the invention. This is a considerable advantage of the invention.

The invention shall now be described with reference to embodiments taken in conjunction with the drawing, in which.

is a diagrammatic view of the upper piece shown in FIG. 3 with severed end joint.

A variant of the method shall be described with reference to FIGS. 1 to 12, wherein a limb 1 (chicken wing) is boned. A center joint 3 (elbow joint) is first removed, as illustrated in FIG. 3. To this end a device similar to the assembly shown in FIG. 9 may be used. Furthermore, limb 1 can be held in a holding means which comprises endless transporting chains 18 having holders 19 secured thereto. Limb 1 can be placed thereinbetween. A first cutting means 2, such as a circular saw, can then remove the center joint 3 along a cutting line 20. This state is shown in FIG. 2.

Figure 2:
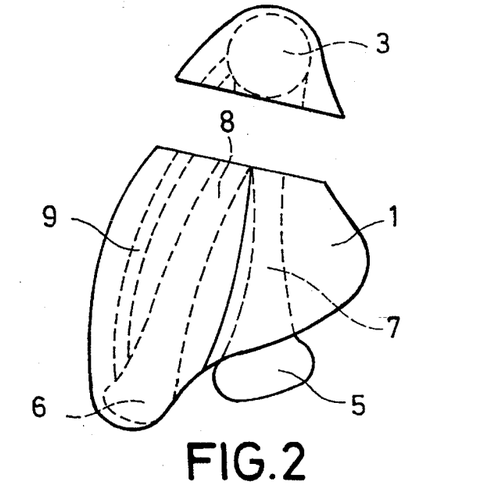
FIG. 2 is a diagrammatic view of the chicken wing shown in FIG. 1 after the center joint has been severed.
Figure 3:
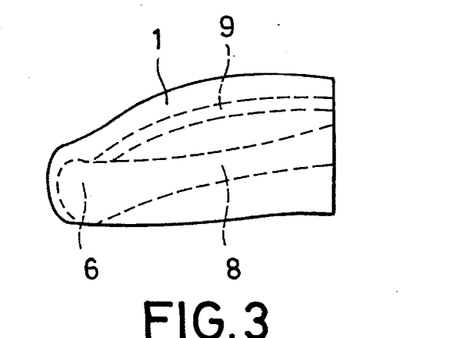
FIG. 3 is a diagrammatic view of the upper piece according to FIG. 2.
Figure 8:
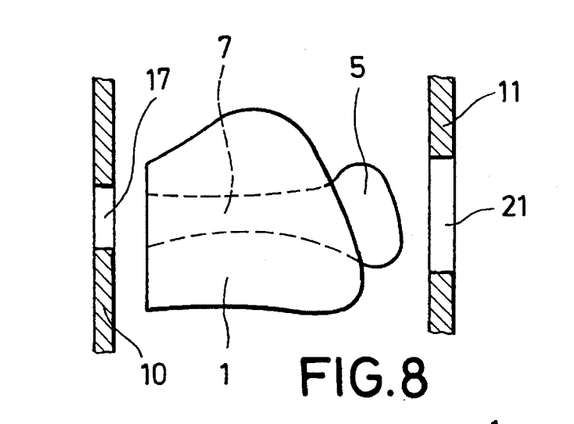
FIG. 8 is a diagrammatic view of the lower wing obtained after the working step shown in FIG. 2, with the lower wing being positioned between two pressure plates.

Since the limb, as is also shown in FIG. 2, is inserted into holder 19 in a state in which the individual bones are each aligned in parallel with one another, one obtains two individual pieces after the center joint 3 has been severed, namely an upper piece shown in FIG. 3 and a lower wing shown in FIG. 8.

Figure 1:
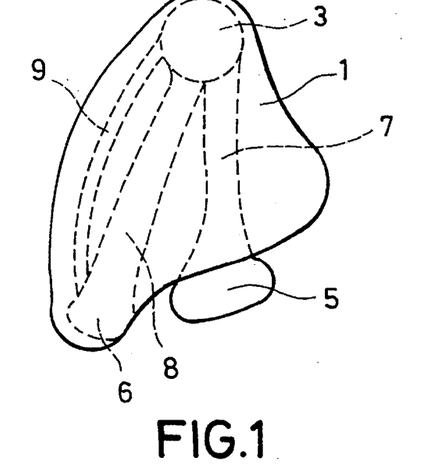
FIG. 1 a diagrammatic view of a limb to be boned, such as a chicken wing.

The limb shown in FIGS. 1 and 2 is a poultry wing and includes an upper wing bone 7. If a chicken leg were concerned, reference numeral 7 would be assigned to a thighbone. This is femur and humerus. Furthermore, the chicken wing comprises ulna 8 and radius 9. As far as a a chicken leg is concerned, there would be a tibia 8 and a fibula 9.

Figure 4:
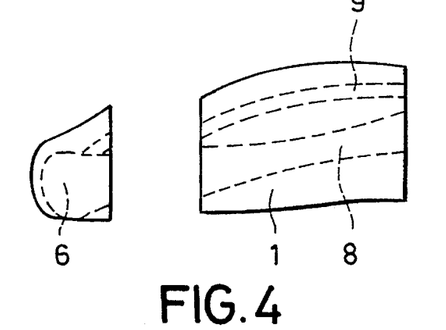
Figure 5:
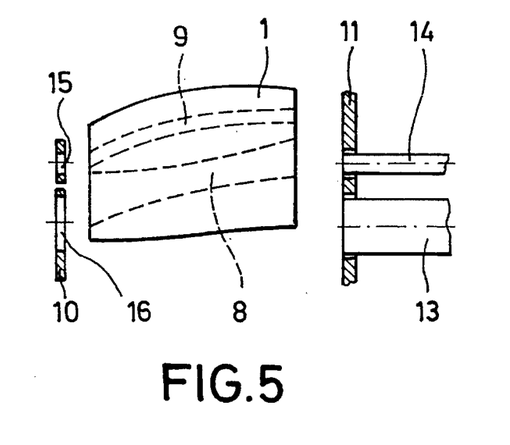
FIG. 5 is a diagrammatic view of the intermediate product shown in FIG. 4, which is disposed between two pressure plates.

The upper wing piece according to FIG. 3 is now further processed by means of a second cutting means to sever an end portion 6. The resultant initial product is arranged between a first pressure plate 10 and a second pressure plate 11. The first pressure plate 10 is provided with recesses 15 and 16 whose size substantially corresponds to radius 9 and ulna 8, respectively; likewise, the alignment of recesses 15 and 16. Pressure plate 11 also comprises recesses in which a second pushing means 13 and a third pushing means 14 are movably supported.

Figure 6:
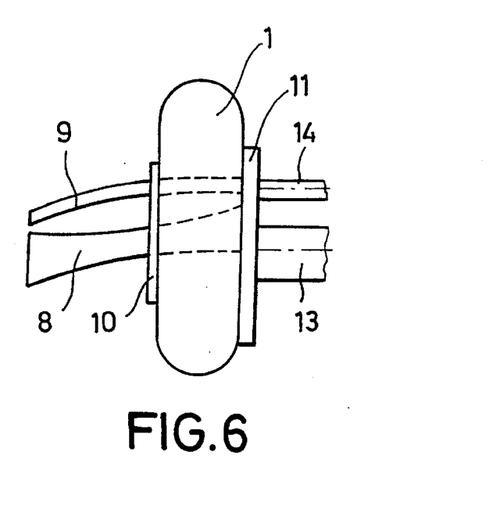
FIG. 6 is a view of the assembly shown in FIG. 5 after the meat has been pressed.

FIG. 6 shows another step in which the first and second pressure plates 10, 11 have been pressed against each other. Since the pushing means 13 and 14 close the recesses of the second pressure plate 11, one obtains a plane contact surface while recesses 15 and 16 of the first pressure plate 10 permit the partial pushing through of ulna 8 and radius 9.

Figure 7:
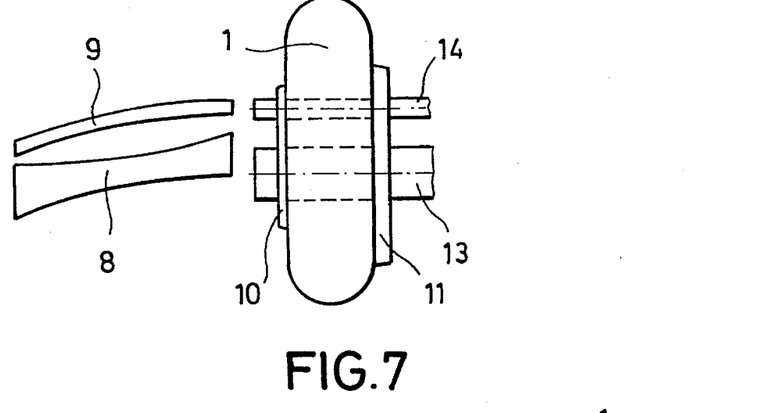
FIG. 7 is a view, similar to FIG. 6, after the bones have been pressed out.

The pushing means 13 and 14 are subsequently pushed forwards, whereby, as shown in FIG. 7, bones 8, 9 are entirely pressed out of the now remaining piece of meat.

The bones are fixed and partly ejected due to the pushing advance movement shown in FIG. 6. This has the effect that the bones are guided through the first pressure plate 10 in a reliable manner and held and that the pushing means 13 and 14 are correctly positioned.

Figure 9:
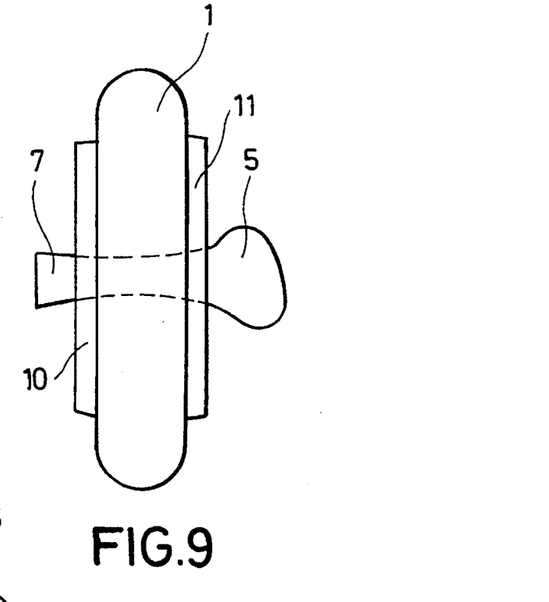
FIG. 9 is a view, analogous to FIG. 6, of the pre-pressed meat.
Figure 10:
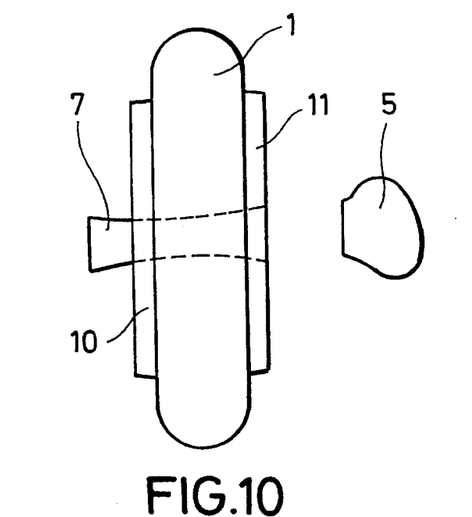
FIG. 10 is a view, similar to FIG. 9, after the end joint has been severed.
Figure 11:
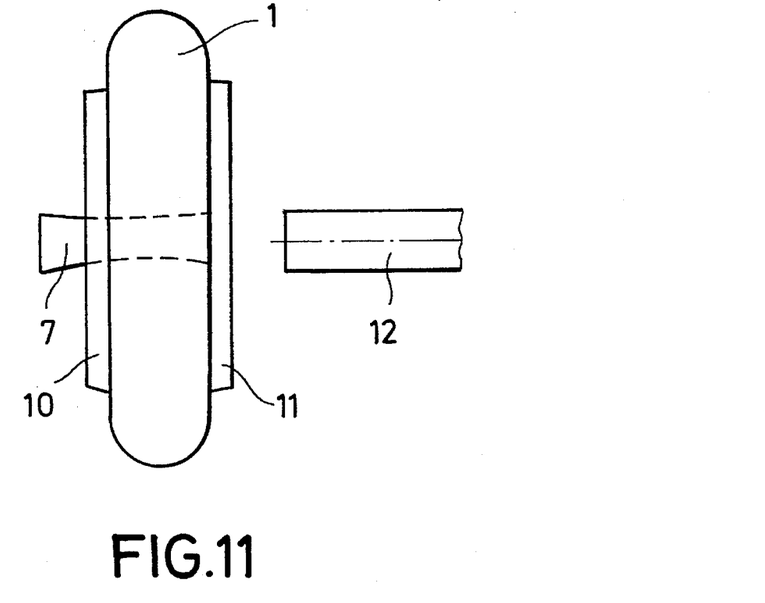
FIG. 11 is a view of the working step following the one of FIG. 10 with illustration of the pushing ejector means.
Figure 12:
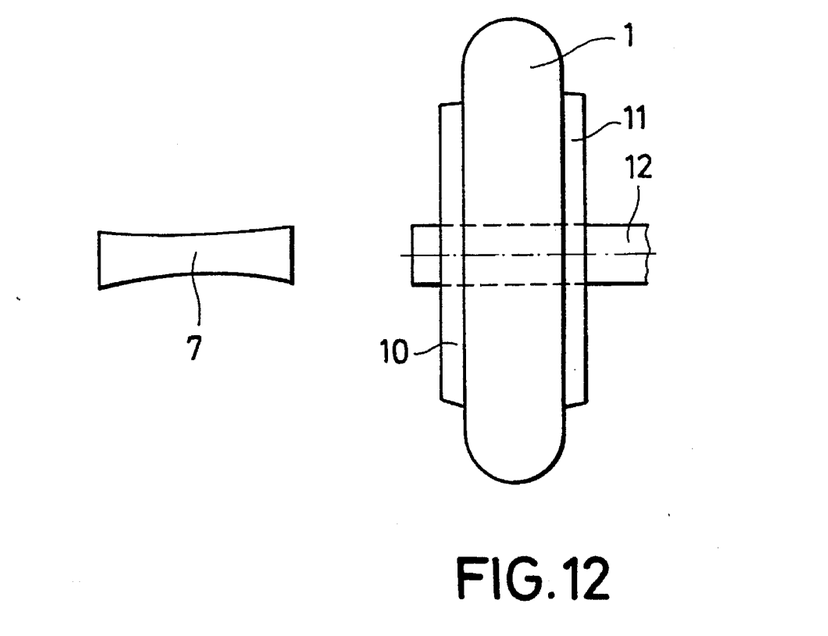
FIG. 12 is a view of the assembly shown in FIG. 11 after the bone has been ejected.
Figure 13:
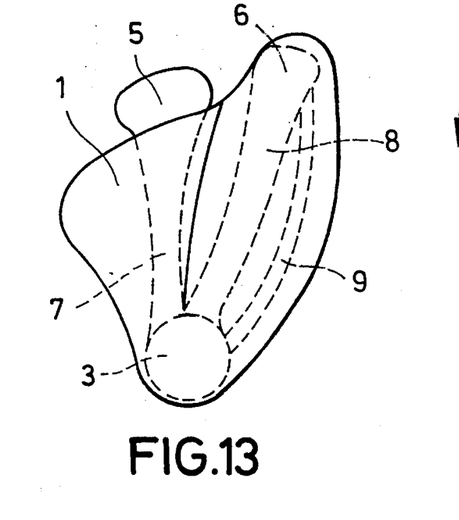
FIG.13 is another view, analogous to FIG. 1, of a chicken wing to be boned.

FIG. 8 shows the lower wing obtained after the working step according to FIG. 2, the lower wing being also positioned between first and second pressure plates 10, 11. The upper wing bone or upper arm bone 7 additionally comprises an end joint 5. As shown in FIG. 8, a recess 17 of the first pressure plate 10 is dimensioned such that the upper wing bone 7 can be pushed therethrough, but not the end joint 5. Furthermore, the second pressure plate 11 has a recess 21 whose size corresponds to the diameter of the end joint 5. The ball of the end jont is guided through recess 21 during the forwardly pushing operation as illustrated in FIG. 9, whereby the meat is stripped off and pushed back while part of bone 7 is pressed through the recess of the first pressure plate 10. Clamping and forward pushing are thereby performed. As illustrated in FIG. 10, ball 5 of the end joint is subsequently severed, e.g., by means of the second cutting means 4. FIG. 11 shows the first pushing means 12 which is placed against bone 7. After pushing means 12 has been passed through pressure plates 10, 11, bone 7 is fully ejected, as shown in FIG. 12.

In another step of the method (not shown), the pressure plates 10, 11 are separated from each other, so that the completely boned meat can be removed.

The method steps and device parts illustrated with reference to FIGS. 1 to 12 are descriptive of the separate processing of the upper wing and the lower wing. It goes without saying that the respective working steps can be carried out in synchronism with one another. As a consequence, the apparatus parts depicted in FIGS. 1 to 12 can also be arranged or made operative in parallel with one another.

The apparatus of the invention and the method of the invention are equally applicable to chicken wings, chicken legs, wings and legs of other poultry or other animals, such as rabbits, hares, etc.

Figure 14:
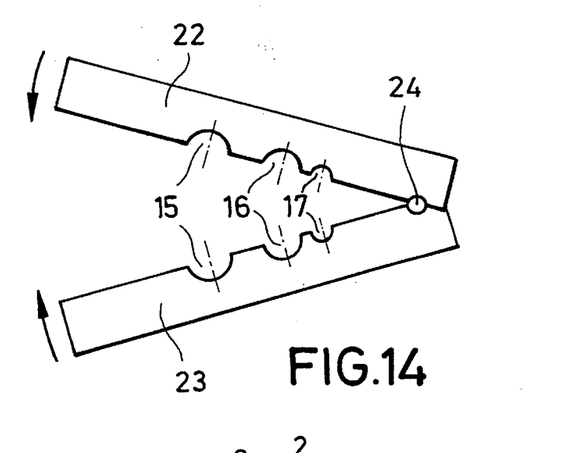
FIG. 14 is a diagrammatic view of a holding device in the form of tongs.
Figure 15:
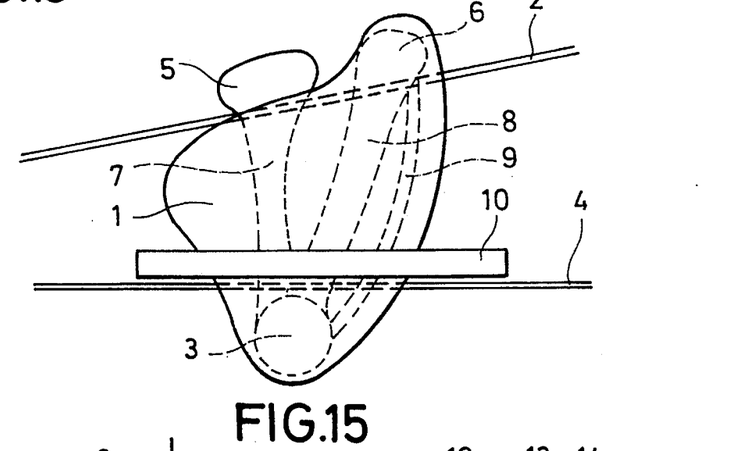
FIG. 15 is an overall view of the blank shown in FIG. 13 after the holding device illustrated in FIG. 15 has been mounted.
Figure 16:
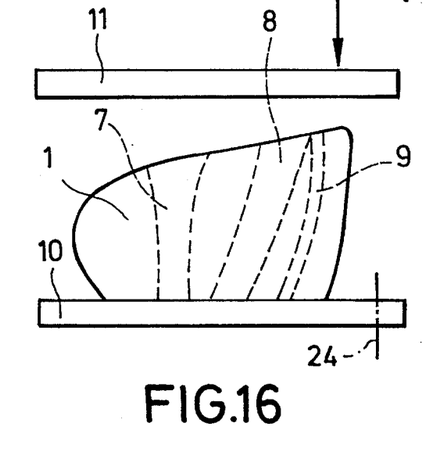
FIG. 16 is a view of the blank shown in FIG. 15 after the center joint and the end joint or end portion have been severed.
Figure 17:
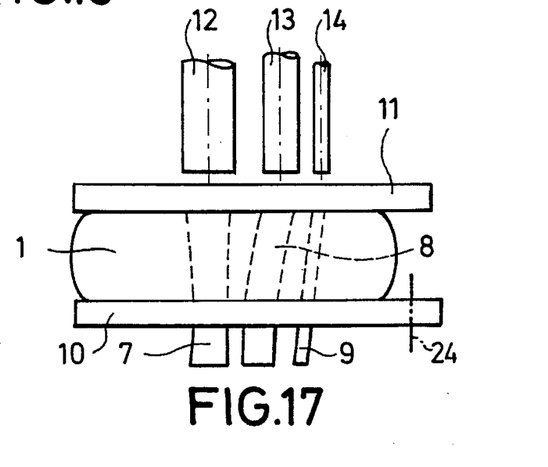
FIG. 17 is a view of the blank shown in FIG. 16 after pressing between two pressure plates has been performed and with approaching push-out means.
Figure 18:
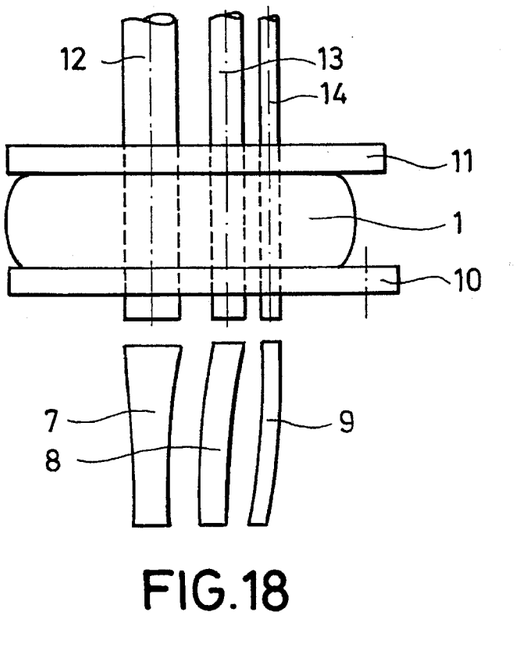
FIG. 18 is a view, similar to FIG. 17, after the bones have been pushed out.

FIGS. 13 to 18 illustrate another variant of the method wherein a holding device in the form of clamping tongs is used, the device being illustrated in detail in FIG. 14. The holding device comprises an upper member 22 and a lower member 23 which are interconnected by means of a hinge 24. There are semicircular recesses 15 to 17 for gripping around bones 7 to 9, as illustrated in FIG. 15. The holding device is mounted next to the center joint 3, with the meat and/or respective skin in the area of the center joint 3 being possibly stripped off before. Furthermore, FIG. 15 shows the cutting paths of the first cutting means 2 and the second cutting means 4. Both the center joint 3 and the end joint 5 and the end portion 6 are removed, resulting in the intermediate product shown in FIG. 16. The holding device with strips 22 and 23 serves as the first pressure plate 10. A second pressure plate 11 is placed thereagainst and, as shown in FIG. 17, pressed forwardly. As a result, the bone is fixed, so that the pushing means 12 to 14 can subsequently be moved closer and, as illustrated in FIG. 18, can be pressed entirely through the pressure plates 10, 11 and the meat. Bones 7 to 9 are thereby removed entirely.

The method as depicted in FIGS. 13 to 18 (together with the associated device) differs from the illustration of FIGS. 1 to 12 in that both parts of the wings are held and processed simultaneously.

Figure 19:
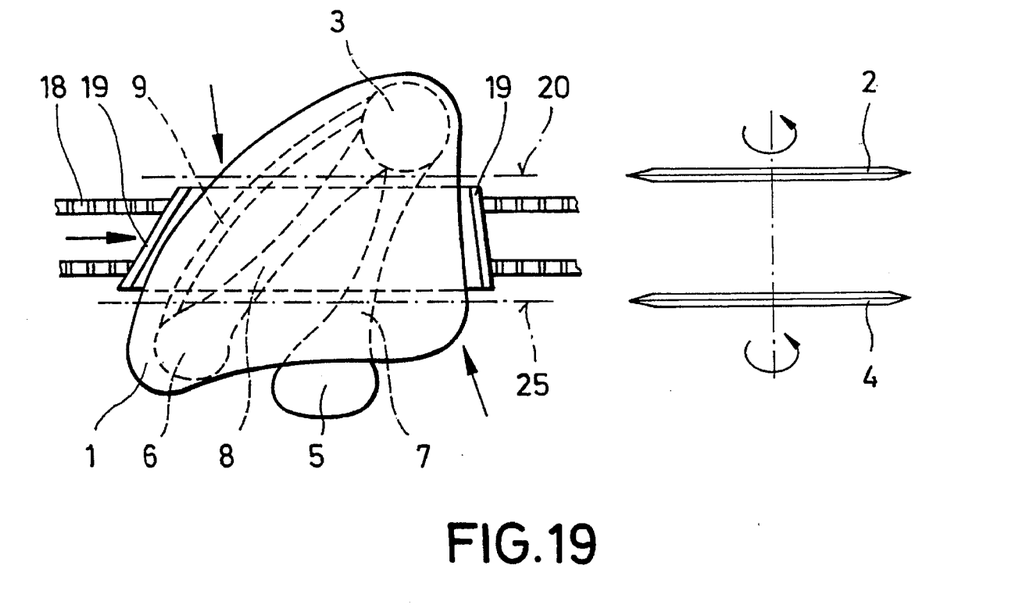
FIG. 19 is another diagrammatic view of a holding and cutting device for severing the center joint portion and the end portions of the limb.

FIG. 19 is a top view of a simplified illustration of another embodiment of the device of the invention, the first cutting means 2 having arranged in parallel therewith the second cutting means 4. The latter is movable along a cutting line 25 so as to sever the end joint 5 and the end portion 6. FIG. 19 does not show the possible pushing back or stripping off of meat and/or skin parts.

FIGS. 20 to 28 illustrate another embodiment of the invention with reference to the boning of a leg, for instance, of a chicken. Like parts have been provided with like reference numerals as in the preceding embodiments.

Figure 20:
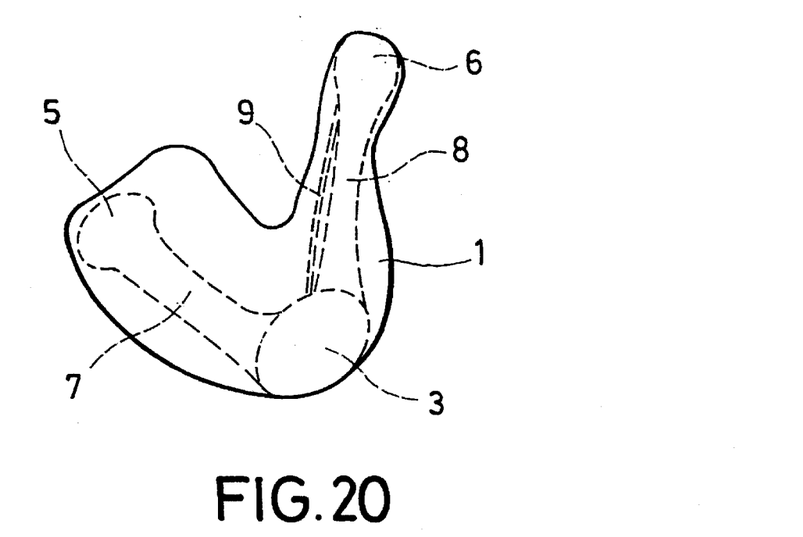
FIG. 20 is a diagrammatic view of a limb to be boned, namely a leg, e.g., of a chicken.

FIG. 20 is a diagrammatic view of the leg of a chicken, the leg comprising a center joint 3, femur 7 with an end joint 5, tibia 8 and fibula 9 with an end portion 6. FIG. 20 illustrates the initial position of the leg in the detached state.

Figure 21:
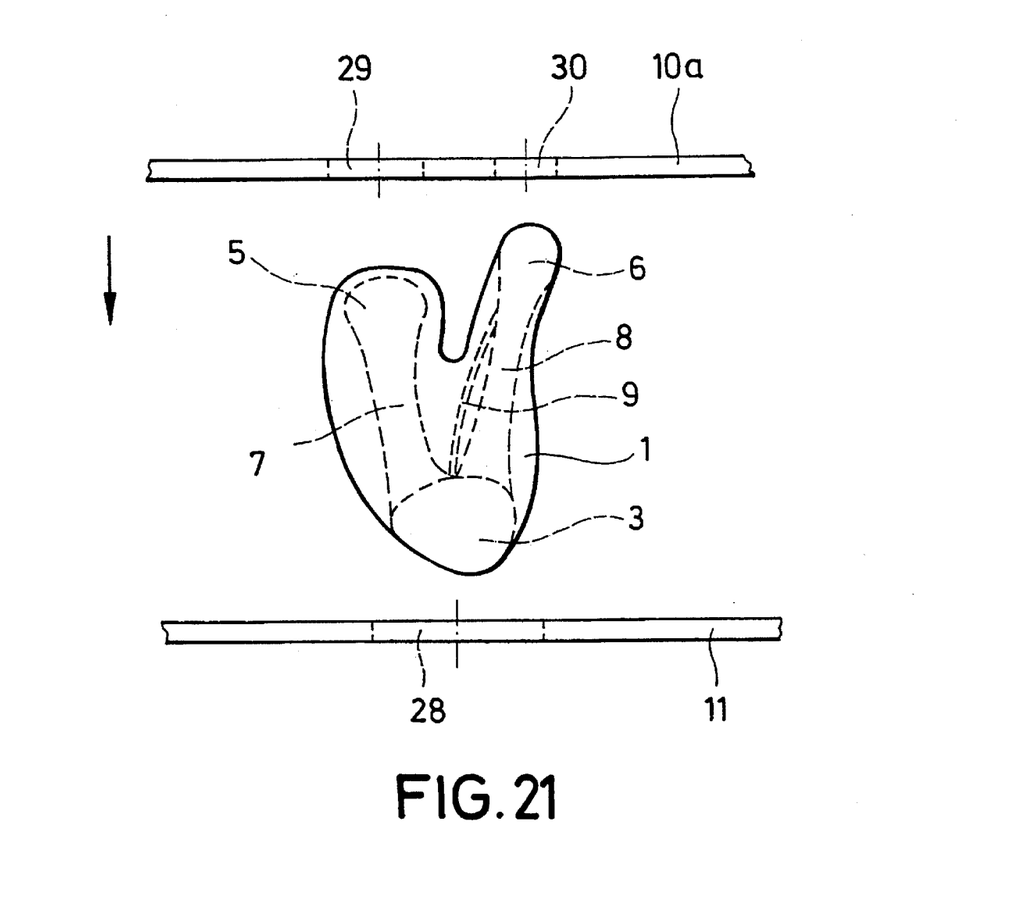
FIG. 21 is a diagrammatic view of the leg shown in FIG. 20 and of first and second pressure plates.

The bones are first aligned substantially in parallel with one another for boning purposes (FIG. 21). Two pressure plates, namely a first pressure plate 10a, shown in FIG. 21 in the upper part, and a second pressure plate 11 are moved close thereto and, as shown by the arrow, moved relative to each other. The second pressure plate 11 is provided with a recess 28 whose size is dimensioned such that, as subsequently described in connection with FIG. 25, the center joint 3 can be passed through recess 28 while the meat and/or skin disposed in the area of the center joint 3 are stripped off, so that joint 3 is substantially exposed.

The first pressure plate 10a is provided with two recesses 29 and 30 whose size is dimensioned such that the end joint 5 or the end joint portion 6 can be pushed through the recesses, whereby meat and skin, repectively, can be stripped off.

Figure 22:
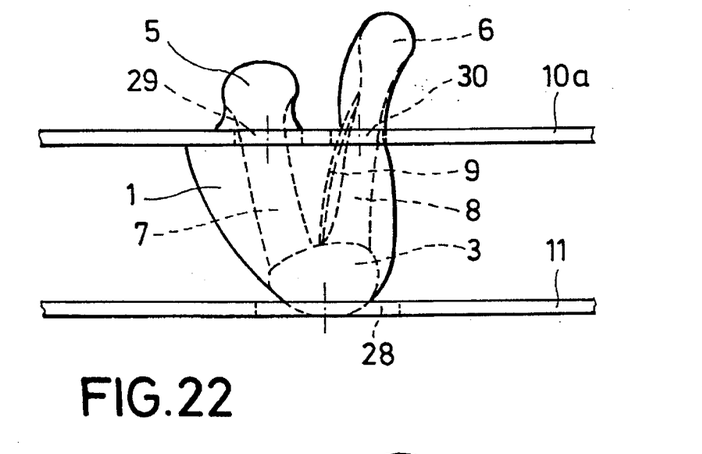
FIG. 22 is a view of the working step following the working step of FIG. 21 after pushing through the first pressure plate.
Figure 23:
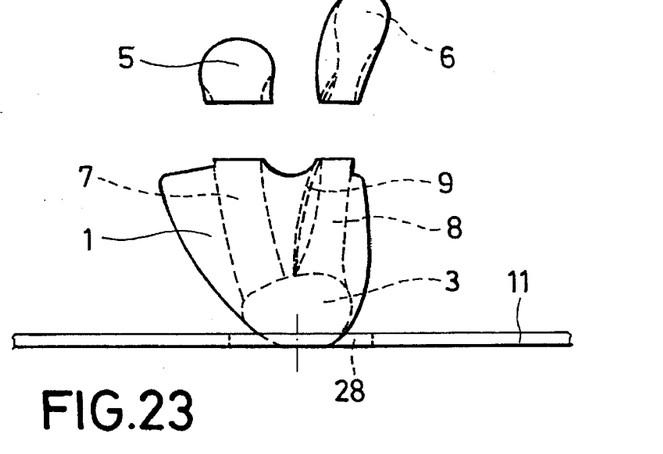
FIG. 23 is a view of the next working step after the the end joints have been severed.

FIG. 22 illustrates the next working step in which the two plates 10a and 11 have been moved towards one another, with the end joint 5 and the end portion 6 being pushed through recesses 29 and 30. The end joint 5 and the end portion 6 can now be severed in parallel with pressure plate 10a. After the pressure plate 10a has been removed, one obtains a state as is diagrammatically illustrated in FIG. 23.

Figure 24:
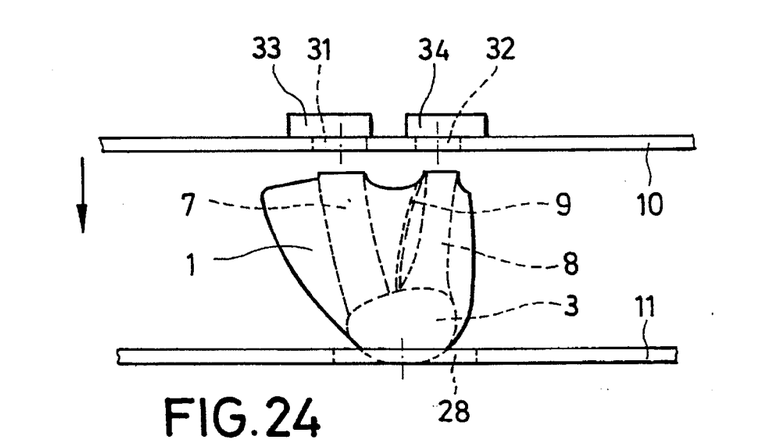
FIG. 24 shows another working step for preparing the separating operation for the center joint.

In a next working step illustrated in FIG. 24, another first pressure plate 10 that is provided with recesses 31 and 32 is brought closer. Recess 31 is dimensioned such that femur 7 can be moved therethrough while recess 32 is designed such that tibia and fibula are jointly pushable through recess 32. Recesses 31 and 32 are closed by closing elements 33 and 34.

Figure 25:
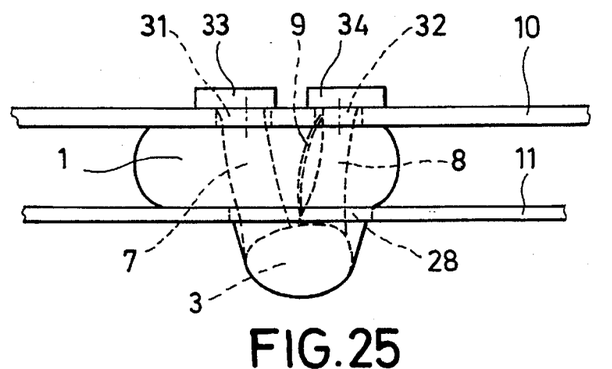
FIG. 25 shows another working step after the meat and the skin have been stripped off in the area of the center joint.
Figure 26:
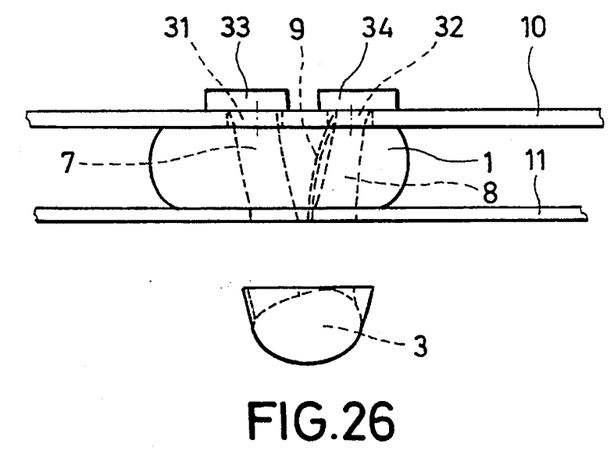
FIG. 26 is a diagrammatic view of the state after the center joint has been separated.

When pressure plates 10 and 11 are brought closer to one another (see the arrow in FIG. 24), bones 7, 8 and 9 are each pressed into recess 31 and 32, respectively, and rest on closure elements 33 and 34 (see FIG. 25). Upon further movement of the two pressure plates 10 and 11 towards one another, the center joint 3 is pressed through recess 28. The pressure plate 11 with recess 28 serves as a die plate, with the skin and meat being stripped off in the area of the center joint 3, as already mentioned, and remaining between the two plates 10 and 11. The center joint 3 can subsequently be separated by means of a saw or a knife, resulting in the state shown in FIG. 26.

Figure 27:
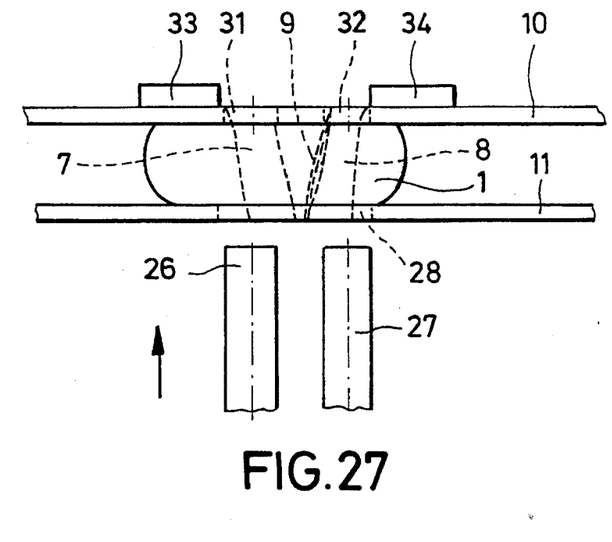
FIG. 27 shows a subsequent working step with approaching pushing means.

In another working step, pushing means 26 and 27 are now moved towards the second pressure plate 11 while the closing elements 33 and 34 simultaneously release recesses 31 and 32. This state is illustrated in FIG. 27.

In a subsequent working step the pushing means 26 and 27 are pushed through recess 28, with the size and arrangement of the pushing means 26 and 27 being chosen such that bones 7, 8 and 9 are ejected through recesses 31 and 32, respectively.

Figure 28:
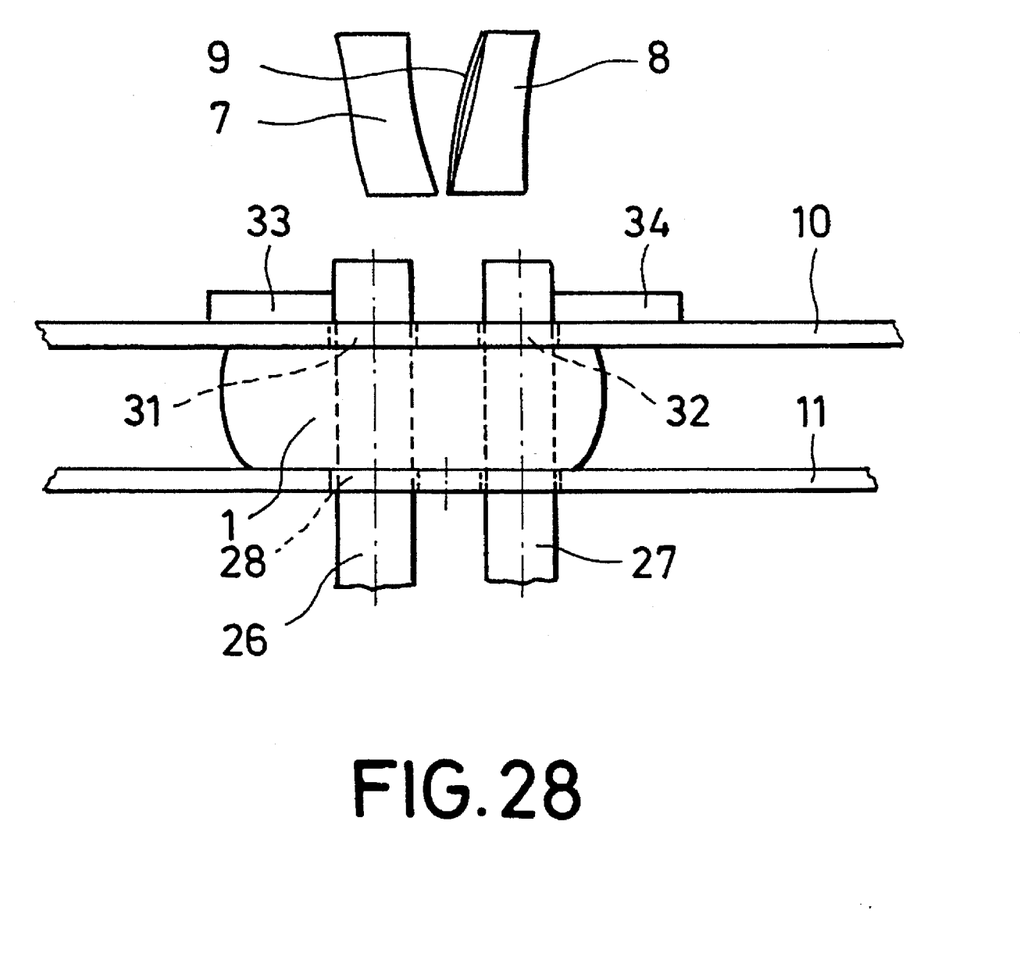
FIG. 28 shows a final working step after the bones have been ejected.

As shown in FIG. 28, an entirely boned piece of meat consequently remains between the two pressure plates 10 and 11. After the pushing means 26 and 27 have been moved back and the pressure plates 10 and 11 have been moved apart, the piece of meat can be removed.

It follows from the above description that each of the bones is pushed out or ejected such that complete boning is ensured. Any subsequent processing is not required.

The embodiments illustrate that the invention can be used in a universal manner for boning limbs. Legs and wings of poultry can be boned just as well as the limbs of other animals, such as rabbits, sheep, etc.

The invention is not limited to the illustrated embodiments. Rather, there are many possible alterations and modifications within the scope of the invention.

To sum up, the following should be noted:

The present invention relates to a device and a method with the following working steps:

holding the limbs (1) to be boned;

severing the center joint (3), including the tendons adhering thereto;

severing the end joint portion (5) and/or the end portion (6), including the tendons adhering thereto;

clamping limb (1) between a first pressure plate (10) and a second pressure plate (11), pressing the meat of limb (1) between the pressure plates (10, 11) and partly pushing out the at least one bone (7, 8, 9) through the pressure plate; and ejecting the at least one bone (7, 8, 9) with the aid of a pushing means (12, 13, 14). (FIG. 17).

I claim:

1. A device for boning limbs of animals having bones similar in strength and orientation to poultry bones, the limbs having two ends with a center joint between the ends, comprising:

a holding means for holding said limbs adjacent said joint and adjacent said ends of said limbs;

a first saw cutting means for separating said center joint of said limbs held in said holding means;

a second saw cutting means for separating said end joints of said limbs held in said holding means; and an ejector device for ejecting the bones, after said center and end joints are separated, by pushing said bones out of said limbs while said limbs are held in said holding means.

2. A device as defined in claim 1, wherein said holding means comprises a stripper die means for pushing said center joint therethrough and for stripping of any meat or skin provided in the area of said center joint.

3. A device as defined in claim 1, wherein said holding means is configured for clamping said bones substantially in parallel.

4. A device as defined in claim 1, wherein one of said first or second cutting means comprises a saw.

5. A device as defined in claim 1, wherein said holding means comprises a first pressure plate and a second pressure plate arranged opposing one another, said plates being movable relative to one another with said limbs interposed between said plates, said first plate being provided with at least one recess for pushing said bones therethrough, and said second plate having at least one recess cooperating with said ejector means for ejecting said bones by pushing.

6. A device as defined in claim 1, wherein said ejector means comprises at least one recess the position of which is associated with the position of said bone as well as a pushing means which is movable through said recess.

7. A device as defined in claim 5, wherein at least one of said pressure plates is designed such that it is divided in the manner of clamping tongs and provided with recesses for gripping around said bones.

8. A device as defined in claim 1, wherein said first and second cutting means are designed such that said joints are severed under separation of the tendons.

9. A method for boning the meat from limbs having two ends and a center joint intermediate said ends, comprising the steps of:

holding said limbs to be boned;

severing said center joint, including any tendons adhering thereto;

severing said ends of said limbs, including any tendons adhering thereto;

clamping said limbs between a first pressure plate and a second pressure plate, at least one of said plates having at least one hole sized and aligned to correspond with the size and location of a severed end of one of said bones;

pressing said meat of said limbs between said pressure plates and partly pushing out the at least one bone through said pressure plate; and pushing a pin through one of said plates to push said at least one bone through said at least one hole.

10. A method as defined in claim 9, comprising the further step of stripping meat and skin from a portion of said bone to be severed prior to at least one of said severing steps.

11. A method as defined in claim 9 comprising the further step of holding all bones in substantially parallel alignment after severing said center joint portion of said limb.

12. A method as defined in claim 10 comprising the further step of holding all bones in substantially parallel alignment after severing said center joint portion of said limb.

13. A method as defined in claim 9 wherein the step of severing of the center joint forms two separate pieces, and wherein one of said separate pieces is boned separately from the other of said piece.

14. A method as defined in claim 12 wherein the step of severing of the center joint forms two separate pieces, and wherein one of said separate pieces is boned separately from the other of said pieces.

15. A method as defined in claim 9 wherein said step of severing the ends occurs before said step of severing said joint.

16. A method as defined in claim 9 wherein said pushing step comprises pushing with a with more then one pin to push out more than one bone at the same time.

17. A method of boning limbs having opposing ends and an joint intermediate said ends, comprising the steps of:

clamping at least one of said limbs between a first pressure plate and a second pressure plate while said bones are substantially parallel, said first plate having at least one hole sized and aligned to correspond with the size and location of one of said ends or joint to allow passage through said hole;

pressing said meat of said clamped limb between said pressure plates and partly pushing out the at least one bone through said hole;

severing the distal portion of the bone pushed out of said hole, including any tendons attached to the bone;

pushing on said severed ends to force the opposite end of the limb though at least a second hole in said second pressure plate;

severing the distal portion of the bone pushed out of said second hole, including any tendons attached to the bone;

pushing at least one pin through at least one of said plates to push said bones out of said meat.

18. A method as defined in claim 17, wherein said first severing step comprises severing the ends of said limb, and said second severing step comprises severing the center joint of said limb.

19. A method as defined in claim 17, wherein said clamping step and said pushing step cooperate to strip off meat and skin from said end.

20. A method as defined in claim 19, wherein said clamping step and said pushing step cooperate to strip off meat and skin from said end.

* * * * *